US012688082B2

(12) United States Patent
Chiricescu

(10) Patent No.: US 12,688,082 B2
(45) Date of Patent: Jul. 21, 2026

(54) DETECTING INJECTION OF FAULTS IN PROGRAM COUNTERS ALTERING EXECUTION OF BASIC BLOCKS OF INSTRUCTIONS

(71) Applicant: The Charles Stark Draper Laboratory, Inc., Cambridge, MA (US)

(72) Inventor: Silviu Chiricescu, Cambridge, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 9 days.

(21) Appl. No.: 18/940,296

(22) Filed: Nov. 7, 2024

(65) Prior Publication Data

US 2025/0147834 A1 May 8, 2025

Related U.S. Application Data

(60) Provisional application No. 63/597,193, filed on Nov. 8, 2023.

(51) Int. Cl.
*G06F 11/07* (2006.01)

(52) U.S. Cl.
CPC ...... *G06F 11/0787* (2013.01); *G06F 11/0721* (2013.01); *G06F 11/079* (2013.01)

(58) Field of Classification Search
CPC ............. G06F 11/0787; G06F 11/0721; G06F 11/079; G06F 11/0751
USPC .......................................................... 714/57
See application file for complete search history.

(56) References Cited

U.S. PATENT DOCUMENTS 10,664,280 B2 * 5/2020 Pota .................... G06F 12/0875
2016/0306632 A1 * 10/2016 Bouzguarrou ........ G06F 9/3848

* cited by examiner

*Primary Examiner* — Yair Leibovich
(74) *Attorney, Agent, or Firm* — Young Basile Hanlon & MacFarlane, P.C.

(57) ABSTRACT

Presented herein are systems and methods of detecting faults in executing blocks of instructions. A processor coupled with memory can identify, from execution of a plurality of instructions of a block, an instruction associated with a program counter during execution of the block. Each instruction of the plurality of instructions can be assigned to one of a first plurality of tags. The first plurality of tags can be ordered in a pre-determined sequence for the block. The processor can compare a first tag of the first plurality of tags in the pre-determined sequence for the block with a second tag of a second plurality of tags assigned to the instruction associated with the program counter. The processor can detect, responsive to the first tag not matching the second tag, a fault with the program counter in the execution of the block.

20 Claims, 5 Drawing Sheets

400

405 — Identify Block of Instructions

410 — Determine Sequence of Tags

415 — Identify Instruction from Block

420 — Assign Tag to Instruction

425 — More Instructions in Block?

Y

N

430 — Load Block on Processor

DETECTING INJECTION OF FAULTS IN PROGRAM COUNTERS ALTERING EXECUTION OF BASIC BLOCKS OF INSTRUCTIONS

CROSS REFERENCE TO RELATED APPLICATIONS

This present application claims the benefit of priority under 35 U.S.C. § 119(e) to U.S. Provisional Patent Application No. 63/597,193, titled "Detecting Injection of Faults in Program Counters Altering Execution of Basic Blocks of Instructions," filed Nov. 8, 2023, which is incorporated herein by reference in its entirety.

BACKGROUND

In a computing environment, a processor can include a program counter register to load an instruction from an instruction set stored on memory. Once loaded, the processor can carry out the instruction to perform one or more specified actions.

SUMMARY

Aspects of present disclosure are directed to systems, methods, devices, and non-transitory computer-readable media for detecting faults in executing blocks of instructions. At least one processor coupled with memory can receive, from execution of a plurality of instructions of a block, an instruction referenced by a program counter. Each instruction of the plurality of instructions can be assigned to one of a first plurality of tags. The first plurality of tags can be ordered in a pre-determined sequence for the block. The at least one processor can compare a first tag of the first plurality of tags in the pre-determined sequence for the block with a second tag of a second plurality of tags assigned to the instruction associated with the program counter. The at least one processor can detect, responsive to the first tag not matching the second tag, a fault with the program counter in the execution of the block. The at least one processor can store an indication identifying the fault in the execution of the block.

In some embodiments, the at least one processor can compare the first tag of the first plurality of tags in the pre-determined sequence for the block matching the second tag of the second plurality of tags assigned to the instruction associated with the program counter. The at least one processor can detect, responsive to the first tag matching the second tag, no fault in the execution of the block. In some embodiments, the at least one processor can store the indication identifying no fault in the execution of the block.

In some embodiments, a number of tags to which to assign to the plurality of instructions of the block can be determined as a function of at least one of: (i) a number of the plurality of instructions, (ii) a number of bits to encode the plurality of instructions, or (iii) a number of altered bits in the program counter to be detected. In some embodiments, the pre-determined sequence defining an order of the first plurality of tags can be generated for the plurality of instructions in the block.

In some embodiments, the at least one processor can assign a subset of instructions identified as critical from the plurality of instructions to a corresponding subset of tags of the first plurality of tags in the pre-determined sequence. Each tag of the subset of tags can be different from one another. In some embodiments, the at least one processor can assign at least one instruction identified as non-critical from the plurality of instructions to a neutral tag of the first plurality of tags.

In some embodiments, at least one of the second plurality of tags on the program counter may be updated in accordance with a policy, responsive to detecting no fault in the execution of the block. In some embodiments, a processor in which the program counter resides may be configured with the pre-determined sequence for the first plurality of tags for detecting faults in the execution of the block.

In some embodiments, the at least one processor can perform, responsive to detecting the fault with the program counter, a countermeasure including at least one of: (i) an interruption of the execution, (ii) a halting of the execution, (iii) a processor reset, or (iv) a provision of an alert. In some embodiments, the at least one processor can provide an output based at least on the indication identifying the fault.

BRIEF DESCRIPTION OF THE DRAWINGS

The foregoing and other objects, aspects, features, and advantages of the present solution will become more apparent and better understood by referring to the following description taken in conjunction with the accompanying drawings, in which.

Figure 1:
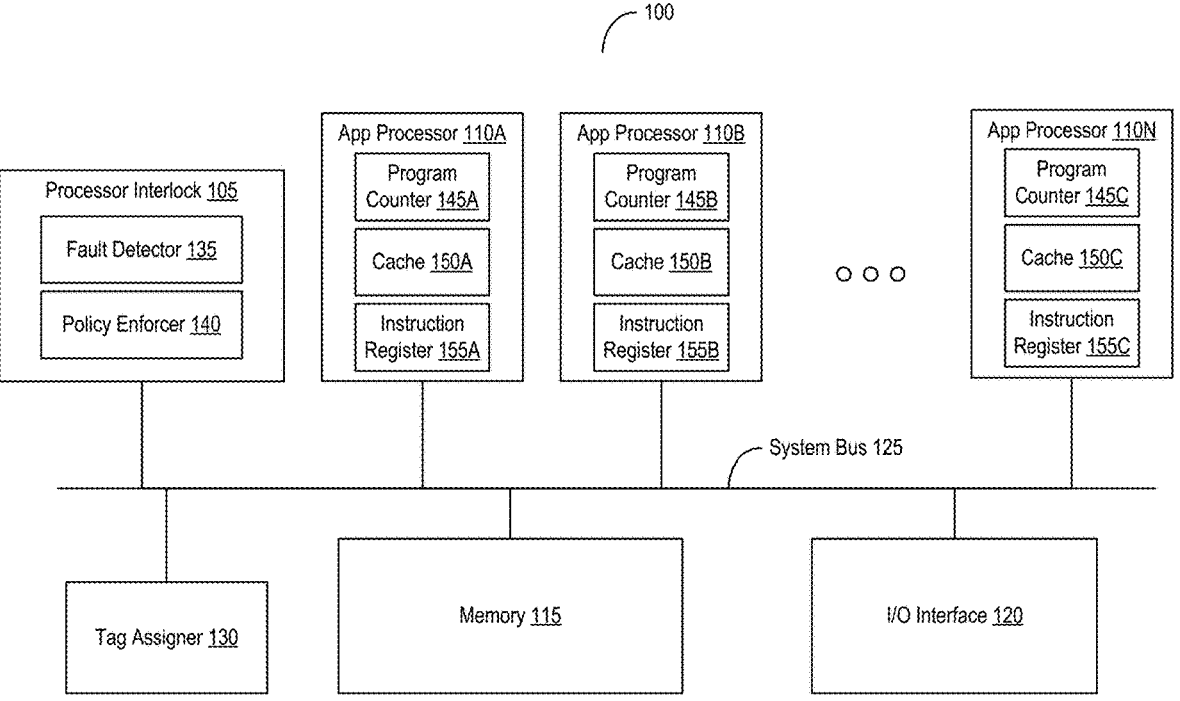
FIG. 1 depicts a block diagram of a system for detecting faults in executing blocks of instructions, in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

In a trusted computing environment, one or more processors (e.g., an application processor, central processing unit (CPU), or one or more processor cores) can enforce one or more safety and security policies, including fault injection (FI) detection. It is possible that a malicious entity or attacker can alter a value of a program counter (PC) to force a root of trust (ROT) of the trusted computing environment to skip over execution of certain instructions corresponding to security checks. The aim of detecting FI may be to pinpoint such attempts to alter the values and to protect the integrity of the PC.

An example of a FI is as follows. For instance, a function can contain four basic blocks: entry, for.body.preheader, for.body, and for.cond.cleanup. There can be both conditional and unconditional branches present in the control flow graph. A FI targeting the PC value in these set of basic blocks could alter the execution of the instruction sequences within one of the four basic blocks. A fault injection altering the value of a register may result in incorrect calculations.

To solve these and other technical challenges, the systems and methods described herein can provide for FI detection. The basic block integrity can be carried out, for example, on the application processor in communication with the processors in the trusted computing environment. The intuition behind this policy may be to ensure that the instructions inside a basic block execute in the order in which the instructions are listed. A basic block may include a set of instructions with a single-entry point and single exit point. Altering the PC while executing instructions from a basic block can result in skipping one or more instructions.

One basic block can include a first label and can include four instructions with the entry point at a first address and the exit point at a second address. To enact the basic block integrity policy, distinct color or other tags can be assigned to each instruction in that basic block. In the example above, when the instruction at the first address is being executed, the resultant PC can be tagged with the appropriate color. When the PC content is now altered, the tag color on the PC may not match the tag color on the instruction to which the PC points to. For instance, if the FI alters the PC value to the second address after or while executing the instruction at the first address, the tag color on the instruction at the second address may not match the tag color of the PC. The lack of the match may result in a policy violation and a detection of the FI.

Tag colors may be re-used when a new basic block is tagged. For example, a set of basic blocks with instructions referring to memory addresses may be tagged with tag colors (e.g., black, red, purple, and black). If a FI alters the PC value the last instruction while executing the instruction at a first address, the policy may not be able to detect such a fault, as the instruction at a second-to-last address has a tag color that should match the tag color of the PC. However, such a transition can, however, be caught across multiple basic blocks through inspecting the control flow integrity.

Tag color reuse can be allowed under certain circumstances. For instance, the number of bits to encode the executed instructions may be denoted as $\log_2 n$, where n is the number of instructions executed during the run. In some instances, the instructions inside any basic block that are executed as part of a loop may be counted once, regardless of how many times that basic block is executed for the purposes of this example calculation.

If there are less bits available for the color tags, how to re-use the colors may be determined. One approach may be to ensure that ensure that instructions inside critical basic block do not share color tags. Another approach may be to maximize the execution distance between instructions that are share the same color tags. To determine the tag color for all the instructions in the basic blocks, the following parameters may be considered. First, the relationship among tag colors assigned to successive instructions in the basic block may be factored. Second, the upper bound limit can be used to detect a FI attack that results in the violation of the policy from the critical or longest path through the basic blocks of the control flow graph. Third, if colors are to be re-used along the critical path, a proper sharing strategy may be used to assign to the tags.

To test for performance, every time the tag is updated on the PC, the process may be reset or flushed. Experiments may be run to measure the effect of this action especially when compared to the cost of reading the tags from external memory. When the performance becomes unacceptable, a PC tag prediction mechanism may be used where there are three possible outcomes of the branch predictor. A first outcome may be the tag on the PC may be correctly predicted and has not changed. A second outcome may be that the tag on the PC is correctly predicted, and the value has been updated. The relationship between the tags on the PC may be programed into the predictor. Another outcome may be that the tag on the PC has not been correctly predicted and the processor may be flushed.

To protect against a single bit flip, the color tag of the instruction at address X may be set to be different from the color of the instruction at address X±2k, where k is the bit position that was flipped (i.e., k=2, (XLEN−1), where XLEN is the architectural word size). That means that, given a number of colors C, $2k(\bmod C) \neq 0$. That condition may be realized with any number of odd colors, so the smallest number of colors C for which the condition is satisfied is 3, regardless of the value of k.

When two PC bits are flipped, the color of the instruction at address X may be set to be different from the color of the instruction at address X±(2k±2j)=X±2j(2k−j±1) assuming, without loss of generality that k>j. Thus, a color C may be assigned such that $(2n\pm1)\bmod C \neq 0$, where n>0 and C cannot be an even number. In this scenario, C=11 may be the smallest number of colors that are to be used to protect against two-bit flips. If the bits that are flipped are adjacent, then k=j+1. and the color of the instruction at address X may be set to different from the color of the instruction at address:

$$X \pm 2j(2 \pm 1) = \begin{cases} X \pm 2^j \\ X \pm 3 * 2_j \end{cases}$$

and the number of colors drop to 5.

To detect whether a program counter has been modified via a bitflip, every instruction in a basic block may be tagged with a color tag, with a consecutive sequence of colors. The first tag prior to the sequence of colors may be a reset color to indicate a start of the instructions in basic block. This has the advantage of being computationally cheap in the case of pc+=4 when the number of colors is static. The policy may then be a check for whether the color of the address of the next decoded instruction is equivalent to previous color plus one modulo color count. If the color count is small, then a bitfield may be used to extend this concept to branches.

The address space may be defined as a list $(x_1, x_2, \dots, x_w)$, where each entry may be initially either 0 or 1. In this example, the address space may represent all integers between [0, 2w]. A function, flip(x), may be defined which will take k bits at random from the bit vector passed to it and invert them (e.g., turning 1 to 0 and 0 to 1). This may be equivalent to a binary exclusive or operation of x with a random permutation of k bits in the address space and is representable here as 1−x. A brute-force solution may become intractable very quickly for an address space of this size. The number of operations for a naïve brute-force (e.g., iterating through all permutations of all bits) may be $(^wP_k)$ $2^w$. A simple optimization (e.g., calculating combinations instead of permutations) brings this down to $$\binom{w}{k}2w$$

in some cases.

Referring now to FIG. 1, depicted is a block diagram of a computing environment or system 100 for detecting faults in executing blocks of instructions. In overview, the system 100 can include at least one processor interlock 105 (sometimes herein referred to as processor), one or more application processors 110A-N (hereinafter generally referred to as application processors 110), memory 115, and input/output (I/O) interface 120, coupled with one another via at least one system bus 125, among others. The system 100 can include at least one tag assigner 130. The processor interlock 105 may include at least one fault detector 135 and at least one policy enforcer 140, among others. Each application processor 110 may include at least one program counter 145A-N (hereinafter generally referred to as a program counter 145), at least one cache 150A-N (hereinafter generally referred to as a cache 150), and at least one instruction register 155A-N (hereinafter generally referred to as an instruction register 155), among others.

The memory 115 may include volatile memory (e.g., random access memory (RAM)), non-volatile memory (e.g., read-only memory (ROM), hard disk drives (HDDs) or other magnetic or optical storage media, solid state drives (SSDs), such as a flash drive or other solid state storage media, hybrid magnetic and solid state drives), or virtual storage volumes, such as a cloud storage, or a combination of such physical storage volumes and virtual storage volumes or arrays thereof, among others.

The I/O interface 120 may include at least one graphical user interface (GUI) (e.g., a touchscreen, a display, etc.), at least one I/O device (e.g., a mouse, a keyboard, a microphone, speakers, a camera, a biometric scanner, an environmental sensor, an accelerometers), among others. The I/O interface 120 may also include interfaces to enable the system 1200 to access a computer network such as a Local Area Network (LAN), a Wide Area Network (WAN), a Personal Area Network (PAN), or the Internet through a variety of wired and/or wireless or cellular connections, among others.

The processor interlock 105, each application processor 110, and the tag assigner 130 may be implemented by one or more programmable processors to execute one or more executable instructions, such as a computer program, to perform the functions of the system. The processors may include circuitry that performs a function, an operation, or a sequence of operations (e.g., as embodied in the fault detector 135, and the policy enforcer 140 of the processor interlock 105). The function, operation, or sequence of operations may be hard coded into the circuitry or soft coded by way of instructions held in a memory device and executed by the circuitry. The processor may perform the function, operation, or sequence of operations using digital values or using analog signals.

In some embodiments, the processor used to implement the processor interlock 105, the application processors 110, or the tag assigner 130 can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The processor may be analog, digital or mixed-signal. In some embodiments, the processor may be one or more physical processors or one or more "virtual" (e.g., remotely located or "cloud") processors. The processor including multiple processor cores or multiple processors multiple processors may provide functionality for parallel, simultaneous execution of instructions or for parallel, simultaneous execution of one instruction on more than one piece of data.

The processor interlock 105 (sometimes referred herein as a processor interlock for policy enforcement (PIPE)) can correspond to or include one or more processors and memory to execute the fault detector 135 and the policy enforcer 140, among others. The fault detector 135 may inspect or monitor execution of instructions from the block on a processor (e.g., on one of the application processors 110). The policy enforcer 140 may carry out measures based upon the results of the inspection by the fault detector 135.

The tag assigner 130 can correspond to or include one or more processors and memory to generate tags to assign to each instruction in a set of instructions of a block. The tag assigner 130 can generate and assign the tags, prior to reading by the processor interlock 105 or execution by the application processor 110. Once the instructions are loaded onto the application processor 110, the processor interlock 105 can update the tags as the instructions are being executed. In some embodiments, the tag assigner 130 can be executed on a computing environment, separate from the system 100. For example, the tag assigner 130 can generate the tags and provide the tags to the system 100 to load the instructions onto the application processor 110 and the tags onto the processor interlock 105. In some embodiments, the tag assigner 130 can be executed within the same system 100 (e.g., as depicted).

The application processor 110 can correspond to or include one or more processors and memory to execute or compute application data. In the application processor 110, the program counter 145 can include or correspond to at least one register to store, buffer, or otherwise hold at least one memory address corresponding to the instruction to be retrieved or fetched from memory (e.g., in the cache 150 or the memory 115). The cache 150 can may include or correspond to memory accessible to the application processor 110 to hold or store data or instructions from main memory (e.g., the memory 115). The cache 150 may be more quickly accessed by the application processor 110, relative to accessing the main memory (e.g., the memory 115). The instruction register 155 can include or correspond to at least one register to store, buffer, or otherwise hold the instruction that is currently executed by the application processor 110. The instruction held by the instruction register 155 can correspond to the instruction previously referenced by the program counter 145.

Figure 2:
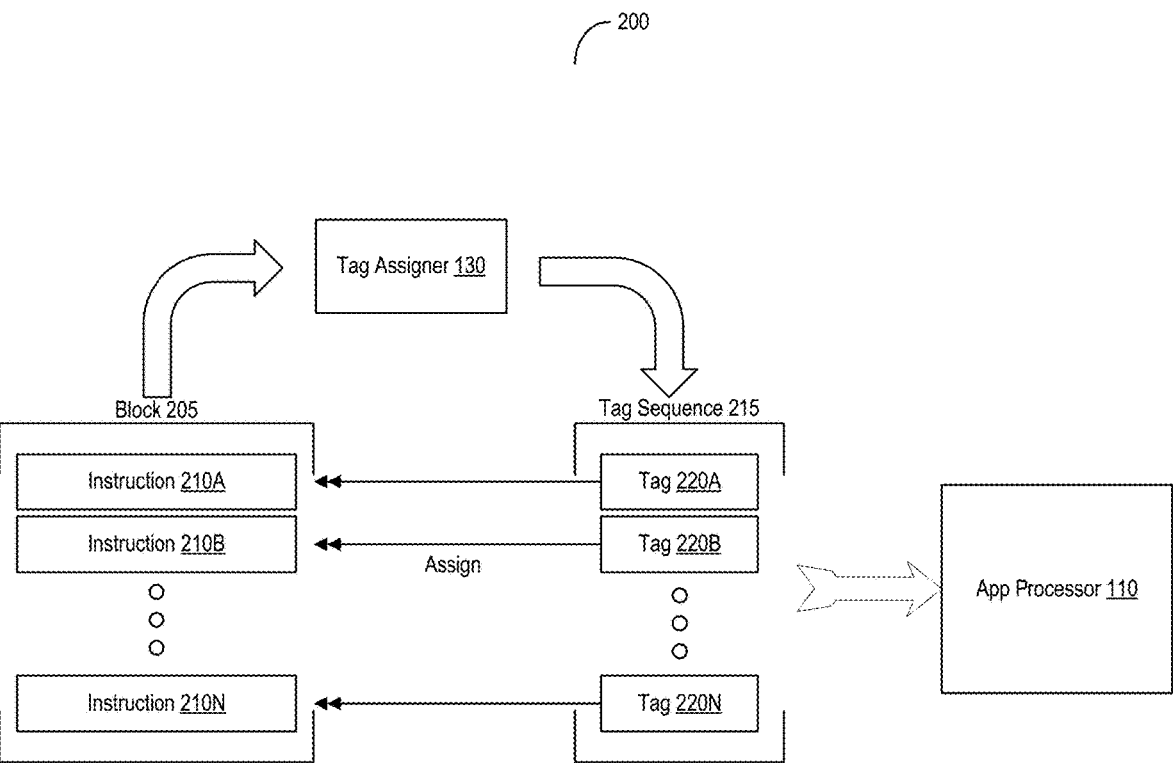
FIG. 2 depicts a block diagram of a process for assigning tags to blocks of instructions in the system for detecting faults, in accordance with an illustrative embodiment.

Referring now to FIG. 2, depicted is a block diagram of a process 200 for assigning tags to blocks of instructions for the system 100 for detecting faults. The process 200 can correspond to or include operations to assign tags instruction in basic blocks. The process 200 can be performed outside the system 100 (e.g., a computing environment including the processor interlock 105 or the application processor 110). Under the process 200, the tag assigner 130 can retrieve, obtain, or otherwise identify at least one block 205 (sometimes referred herein as a basic block) to be loaded onto one or more application processors 110. In some embodiments, the tag assigner 130 can retrieve or identify the block 205 stored and maintained on the memory 115.

The block 205 can correspond to or include a set of instructions 210A-N (hereinafter generally referred to as instructions 210). Within the block 205, the set of instructions 210 may be a sequence (e.g., straight-line sequence) of machine-readable code to be read and executed by the application processor 110. The block 205 may lack branches (e.g., conditional statements) or jumps (e.g., go-to statements). The block 205 may include an entry (e.g., the very first instruction 210A) and an exit (e.g., the very last instruction 210N). The exit can specify execution of instructions of another block 205. The machine-readable code for the set of instructions 210 in the block 205 may be in accordance with any machine code (e.g., instruction set architecture (ISA), such as RISC-V or x86 assembly language) among others. The machine code may have been manually written by a developer or may have been generated using a compiler from a higher-level programming language (e.g., LISP, PERL, C, C++, C #, PROLOG, Python, and Java). The block 205 may be part of a set of blocks in a form of a control flow. The control flow may specify, identify, or define an execution path among the set of blocks (including the block 205). The control may also be part of one or more threads in a process (e.g., an executable or computer program) running in the computing environment.

With the identification, the tag assigner 130 can produce, determine, or otherwise generate at least one tag sequence 215 for the block 205. The tag sequence 215 (sometimes herein referred to as a pre-determined or pre-defined sequence) may identify or include a set of tags 220A-N (hereinafter generally referred to as tags 220 or color tags). The tag sequence 215 may define, specify, or otherwise identify an order in accordance with which the set of tags 220 are arranged. The order for the set of tags 220 identified by the tag sequence 215 may be used to validate or check whether the program counter 145 executing the block 205 has been affected by fault injection. Each tag 220 may identify or include an identifier for the corresponding instruction 210 in the block 205. The identifier for the tag 220 may include, for example, a color code (e.g., in red, green, and blue (RGB) value, a hue, saturation light (HSL) value, or cyan, magenta, yellow, and block (CMYK) value) a set of alphanumeric characters, or a numerical value (e.g., a byte, a hexadecimal, or decimal number, among others.

In generating the tag sequence 215, the tag assigner 130 can calculate, identify, or otherwise determine a number of tags to assign to the set of instructions 210 of the block 205. The number of tags may be determined by the tag assigner 130 as a function of one or more factors, such a number (or length) of the instructions 210 in the block 205, a number of bits to encode the set of instructions 210, or a number of altered (e.g., flipped) bits in the program counter 145 targeted to be detected, among others. In some embodiments, the tag assigner 130 can count, determine, or identify the number of the instructions 210 from the length of the block 205. In some embodiments, the tag assigner 130 can calculate or determine the number of bits for encoding based on a length of each individual instruction 210 within the block 205. With identification, the tag assigner 130 can determine the number of tags to use for the tag sequence 215. For instance, the tag assigner 130 calculate a log-base two of the cumulative length of all the instructions 210 in the block 205 to determine the number of bits. Upon calculation, the tag assigner 130 can use the number of bits as the number of different tags to be generated for the tag sequence 215.

With the determination, the tag assigner 130 can generate the set of tags 220 for the tag sequence 215 in accordance with the number of tags to be used. The tag assigner 130 can compare the number of tags to be used with the number of instructions 210 in the block 205. When the number of tags to be used is less than the number of instructions 210, the tag assigner 130 can generate the set of tags 220 to at least partially repeat. The tag sequence 215 may include reuse or repeat one or more tags 220 in the set. For example, the tag sequence 215 may include a one cycle of tags 220 (e.g., red, blue, magenta, and black, and repeat) and a portion of the cycle of tags 220 in the defined order. Otherwise, when the number of tags to be used is greater than or equal to the number of instructions 210, the tag assigner 130 can generate the set of tags 220 to lack repetition or reuse. For instance, the tag sequence 215 can include a whole cycle of tags 220, without repeat or reuse.

Upon generation of the tag sequence 215, the tag assigner 130 can associate, link, or otherwise assign the set of tags 220 of the tag sequence 215 with the corresponding set of instructions 210 in the block 205. The assignment of the tags 220 to the corresponding instructions 210 may be in accordance with the order defined by the tag sequence 215. In some embodiments, the tag assigner 130 can select or identify a subset of instructions 210 from the block 205 as critical. The identification may be based on a type of the instruction 210, such as entry, data retrieval, security check operation, or exit, among others. When the instruction 210 is identified as corresponding to one of these types labeled as critical, the tag assigner 130 can identify the instruction 210 from the block 205 as critical. The tag assigner 130 can assign the subset of tags 220 identified as critical to a corresponding subset of tags 220 that differ from one another. In some embodiments, the tag assigner 130 can select or identify one or more instructions 210 from the block 205 as non-critical. For instance, when the instruction 210 is identified as not corresponding to a type labeled as critical, the tag assigner 130 can identify the instruction 210 from the block 205 as non-critical. For each instruction 210 identified as non-critical, the tag assigner 130 can assign a neutral tag of the tag sequence 215. The neutral tag can correspond to one or more tags 220 that can be skipped in fault injection detection at the program counter 145 while the block 205 is executed.

With the assignment, the tag assigner 130 can load or configure the application processor 110 (or the program counter 145 or cache 150 thereon) with the set of instructions 210 of block 205 assigned with the set of tags 220 of the tag sequence 215. In some embodiments, the tag assigner 130 can load or configure the block 205 separate from the tag sequence 215 on the application processor 110. In some embodiments, the tag assigner 130 can store and maintain the set of instructions 210 of block 205 assigned with the set of tags 220 of the tag sequence 215 on the memory 115 to be later loaded by the application processor 110.

In some embodiments, the tag assigner 130 can output, produce, or otherwise generate a policy for the block 205 assigned with the tag sequence 215. The policy can identify, define, or otherwise specify the set of tags 220 of the tag sequence 215 assigned to the corresponding instructions 210 of the block 205. In some embodiments, the policy can specify a generation of the set of tags 220 or 220' for the corresponding set of instructions 210 during execution of the block 205 by the program counter 145. For example, the policy can specify that a subsequent tag 220' is to be calculated, determined, or otherwise generated in sequence relative to a value of the previous tag 220' or using a combination of operations, such as addition or modulus division of the value corresponding to the prior tag 220'. The policy can also specify an output to be generated, based on whether a fault or no fault is detected the program counter 145 when reading the set of instructions 210. For instance, the policy can define the generation of a tuple in the form of: a result (e.g., fault or no fault), an identification tag, and an indication of allowance (e.g., when no fault occurs) or rejection (e.g., when fault occurs), among others. The policy can specify that when the fault is detected, the indication is to identify the block 205, the instruction 210, the tag 220 (or 220'), and a descriptor of the fault, among others. Conversely, the policy can specify that when no fault is detected, the indication is to identify the block 205, the instruction 210, the tag 220 (or 220'), and an identification of a lack of a fault. The policy can also specify updating of the program counter 145, when the instruction 210 is checked to ensure no violation of security policy.

Figure 3:
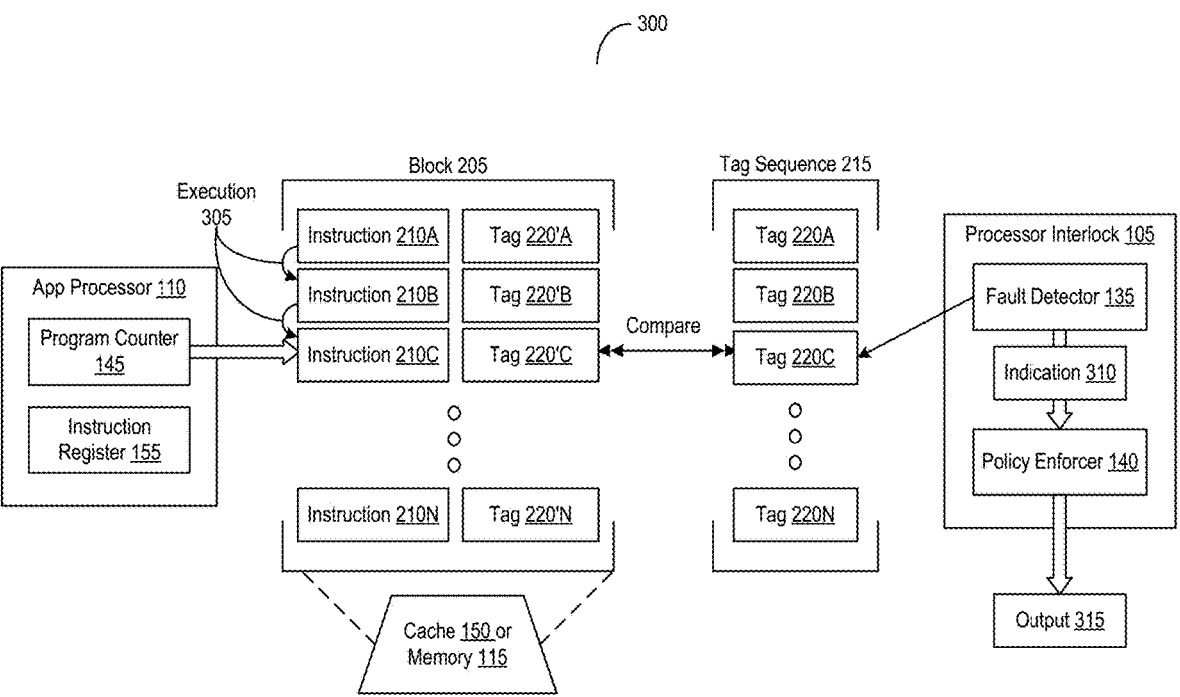
FIG. 3 depicts a block diagram of a process for comparing tags to check for faults in the system for detecting faults, in accordance with an illustrative embodiment.

Referring now to FIG. 3, depicted is a block diagram of a process 300 for comparing tags to check for faults in the system 100 for detecting faults. The process 300 can correspond to or include operations to check for faults in the execution of the basic blocks. Under the process 300, the processor interlock 105 (or another component) may have propagated or provided the assignment of tags 220 of the tag sequence 215 to the memory (e.g., the memory 115) and to the program counter 145 on the application processor 110. The application processor 110 can carry out, perform, or otherwise execute the set of instructions 210 of the block 205 from memory (e.g., the memory 115 or the cache 150). For each execution 305, the program counter 145 on the application processor 110 can retrieve, determine, or otherwise identify a memory address referencing the instruction 210 to be executed in memory. Upon identification, the instruction register 155 can store or load the referenced instruction 210 from the memory.

The application processor 110 can carry out one or more operations specified by the instruction 210 loaded on the instruction register 155. The process of execution 305 of the block 205 may be repeated until the last instruction 210 (e.g., the instruction 210N), with the referencing by the program counter 145, loading of the referenced instruction 210 by the instruction register 155, and so forth. A fault injection may occur in the program counter 145, when the application processor 110 skips or otherwise fails to execute the set of instructions 210 in consecutive sequence. For example, the fault injection may cause the program counter 145, after executing the first instruction 210A, to skip the second instruction 210B and execute the third instruction 210C. The fault injection can also cause the program counter 145 to execute instructions from a different block 205 of instructions.

In conjunction, the fault detector 135 on the processor interlock 105 can retrieve, receive, or otherwise identify the block 205 including the set of instructions 210, prior to or in partial concurrence with the execution 305 by the application processor 110. As discussed above, each instruction 210 of the block 205 can be assigned to one of the tags 220. The set of tags 220 can be ordered as defined by the tag sequence 215. During the execution 305 of the block 205, the fault detector 135 can obtain, retrieve, or otherwise identify the instruction 210 referenced by the program counter 145 (e.g., the instruction 210C as depicted). For instance, the fault detector 135 can access the program counter 145 in the application processor 110 to identify the memory address corresponding to the instruction 210 currently referenced by the program counter 145. Upon identifying, the fault detector 135 can identify the instruction 210 referenced by the memory address held by the program counter 145.

With the identification, the fault detector 135 can obtain, identify, or otherwise retrieve a tag 220'A-N (hereinafter generally referred to as the tag 220') assigned to the instruction 210 referenced by the program counter 145. In conjunction, the fault detector 135 can obtain, identify, or otherwise retrieve the tag 220 from the tag sequence 215 in accordance with the defined order for the block 205. In some embodiments, the fault detector 135 can maintain a counter to keep track of the number of instructions 210 executed by the application processor 110. Using the value for the number of instructions 210 as identified by the counter, the fault detector 135 can identity the tag 220 from the corresponding position within the tag sequence 215. For example, if the number of instructions 210 previously executed is two, the fault detector 135 can retrieve the third tag 220C from the tag sequence 215, to compare with the tag 220'C assigned to the instruction 210. Depending on whether a fault was injected in the program counter 145, the tags 220 and 220' may differ or be the same. In some embodiments, the fault detector 135 can load the tag 220 from the tag sequence 215 associated with the instruction 210 referenced by the program counter 145. The tag sequence 215 can be loaded onto a storage (e.g., a register) local to the processor interlock 105.

The fault detector 135 can compare the tag 220 from the tag sequence 215 for the block 205 with the tag 220' assigned to the instruction 210. Based on the comparison, the fault detector 135 can identify or determine a presence or an absence of the fault in the program counter 145 in executing the block 205. In response to the case where the tag 220 from the tag sequence 215 corresponds to or matches the tag 220' assigned to the instruction 210, the fault detector 135 can continue checking for the presence or the absence of the fault, as the application processor 110 execute the next instruction 210 in the block 205. When no fault is detected throughout the execution 305 of the block 205, the fault detector 135 can determine, identify, or otherwise detect the absence of the fault in the program counter 145 in the execution of the block 205. In addition, the program counter 145 can be updated by the fault detector 135 in accordance with the policy (e.g., the policy for the block 205). For example, the application processor 110 on which the program counter 145 resides can produce, create, or otherwise generate an output in accordance with policy with a tuple in the form of: result, tag, and an indication of allowance, among others. The program counter 145 can continue to execute the remainder of the block 205.

Conversely, if the tag 220 from the tag sequence 215 does not correspond to or match the tag 220' assigned to the instruction 210, the fault detector 135 can determine, identify, or otherwise detect the presence of the fault in the program counter 145. The injection of the fault may have caused the program counter 145 to skip one or more instructions 210 during the execution of the block 205, and as a result, the tag 220' assigned to the instruction 210 subsequent to the skips may differ from the tag 220 specified by tag sequence 215 defined for the block 205. In some embodiments, the fault detector 135 can also identify, select, or otherwise determine a fault type associated with the presence of the fault in the program counter 145 based on the comparison of the tag 220 with the tag 220'. The fault type can include, for example, a skipping ahead (e.g., injection) or stalling (also referred herein as a delay or re-execution) at least one instruction 210 in the block 205. If the tag 220' assigned to the instruction 210 is ahead relative to the tag 220 in the tag sequence 215, the fault detector 135 can identify the fault as an injection. Otherwise, if the tag 220' assigned to the instruction 210 is behind relative to the tag 220 in the tag sequence 215, the fault detector 135 can identify the fault as a delay.

In some embodiments, the fault detector 135 can determine whether the fault associated with the instruction 210 is critical or non-critical in the block 205. The determination may be based on the tag 220 in the tag sequence 215 for the instruction 210 (e.g., neutral tag) or based on a type of operation specified by the instruction 210 (e.g., entry, data retrieval, security check operation, or exit), among others. The fault detector 135 can determine or identify the type of operation specified by the instruction 210 as one of critical or non-critical. If identified as non-critical, the fault detector 135 can ignore the presence of the fault and permit the application processor 110 to execute the next instruction 210. In some embodiments, the fault detector 135 can detect no fault in the program counter 145 when the instruction 210 is identified as non-critical. Otherwise, if identified as critical, the fault detector 135 can detect the presence of the fault in the program counter 145.

The fault detector 135 can also output, produce, or otherwise generate at least one indication 310 based on the detection of the presence or the absence of the fault in the program counter 145. The generation of the indication 310 can be in accordance with the policy. When the presence of the fault is detected, the fault detector 135 can generate the indication 310 to identify the presence of the fault in the program counter 145. The indication 310 can identify or include information about the execution 305 of the block 205, such as the instruction 210 when the fault is detected, an identifier for the program counter 145, an identifier for the application processor 110, an identifier of the block 205, or a descriptor of the fault (e.g., type of operation, indication of critical instruction, or fault type), among others. When the absence of the fault is detected, the fault detector 135 can generate the indication 310 to identify the absence of the fault in the program counter 145. The indication 310 can identify or include information about the execution 305 of the block 205, such as the identifier for the program counter 145 lacking the fault, the identifier for the application processor 110, or the identifier of the block 205, among others. With the generation, the fault detector 135 can store and maintain the indication 310 (e.g., on the memory 115).

Using the indication 310, the policy enforcer 140 on the processor interlock 105 can generate, produce, or otherwise provide at least one output 315. The output 315 may identify or include at least a portion of the information from the indication 310. With the generation, the policy enforcer 140 can provide the output 315 for presentation (e.g., via the I/O interface 120 to a display coupled with the system 100). In addition, the policy enforcer 140 can carry out, execute, or otherwise perform at least one countermeasure, when the presence of the fault is detected in the program counter 145. The countermeasure can be to address the fault injection in the program counter 145, the application processor 110, the instruction 210, or the block 205, among others. The countermeasure may include, for example, an interruption of the execution 305 (e.g., by skipping the instruction 210 associated with the fault), a halting of the execution 305 (e.g., by stopping the program counter 145), a processor reset (e.g., by refreshing or clearing the application processor 110, including the program counter 145, the cache 150, and the instruction register 155), or a provision of an alert (e.g., a presentation of a message notifying an administrator of the system 100 regarding the fault), among others.

In some embodiments, the policy enforcer 140 can select or identify the countermeasure to perform in accordance with the policy. When the policy specifies the countermeasure as the interruption of the execution 305, the policy enforcer 140 can interrupt the execution 305 of the instruction 210 associated with the fault. When the policy specifies the countermeasure as the halting of the execution 305, the policy enforcer 140 can stop the execution 305 of the instruction 210 associated with the fault. When the policy specifies the countermeasure as a process reset, the policy enforcer 140 can clear or refresh the application processor 110, including the program counter 145, the cache 150, or the instruction register 155, among others. When the policy specifies the countermeasure as the providing the alert, the policy enforcer 140 can generate the output 315 for presentation.

In this manner, the integrity of the program counter 145 in executing the block 205 including the set of instructions 210 may be preserved, thwarting attacks by malicious entities attempting to alter behavior of the application processor 110 and the overall system 100. The set of tags 220 of the tag sequence 215 can also provide a light-weight approach, relative to more computationally complex techniques, to preventing attacks on the program counter 145 during the execution 305 of the block 205. The generation of the tag sequence 215 and the assignment of the tags 220 to the instructions 210 of the block 205 can thus not only reduce security vulnerability of the program counter 145, but also decrease computer resource consumption (e.g., in the form of processing power and memory) in protecting the program counter 145. With this light-weight approach, faults can be detected in the program counter 145 and countermeasures can be carried out by the policy enforcer 140 with much less consumption of computing resources (e.g., from processing power and memory) and fractions of time compared to computationally complex approaches. The fault detection detailed herein can also allow the system 100 to handle faults with higher reliability and in an uninterrupted manner, with reduced system downtime resulting from failures and shutdowns. This can also significantly decrease the potential for propagation of errors to propagate through the instructions 210 in the program counter 145, isolating any malfunctions or errors due to faults to the time of detection and minimizing or eliminating its impacts.

Figure 4:
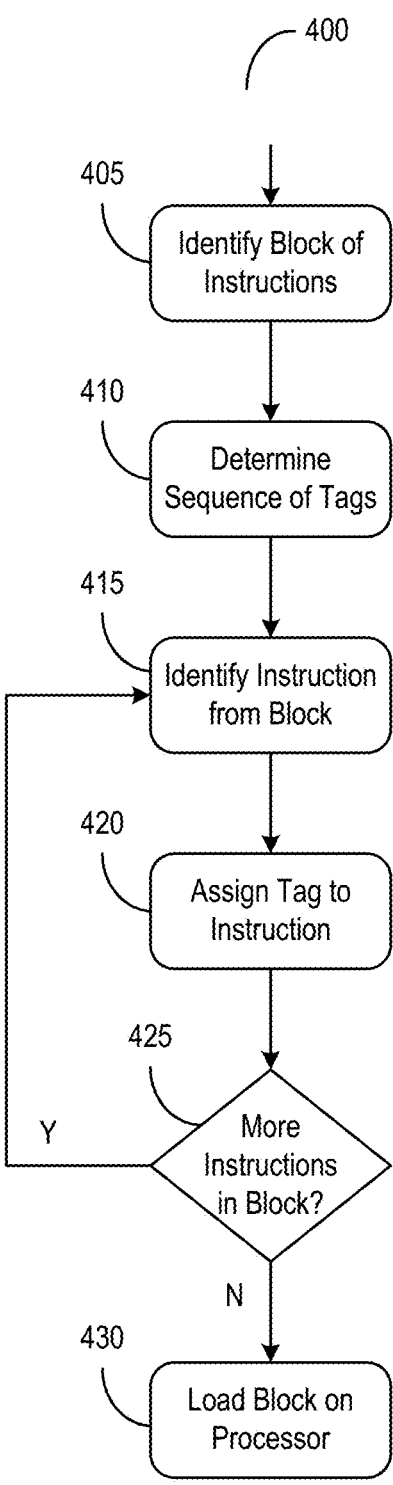
FIG. 4 depicts a flow diagram of a method of configuring blocks of instructions with tags, in accordance with an illustrative embodiment.

Referring now to FIG. 4, depicted is a flow diagram of a method 400 of configuring blocks of instructions with tags. The method 400 can be implemented using or performed by any of the components detailed herein, such as the system 100. Under the method 400, one or more processors (e.g., the processor interlock 105) can identify a block (e.g., the block 205) of instructions (e.g., the set of instructions 210) (405). The one or more processors can determine a sequence of tags (e.g., the tag sequence 215) for the block (410). The one or more processors can identify an instruction (e.g., the instruction 210) from the block (415). The one or more processors can assign a corresponding tag (e.g., the tag 220) to the identified instruction (420). The one or more processors can determine whether there are more instructions in the block (425). If there are more instructions, the one or more processors can repeat the functionality of the method 400 from the step (415). Otherwise, if there are no more instructions, the one or more processors can load the block with the tagged instructions onto a processor (e.g., the application processor 110) (430).

Figure 5:
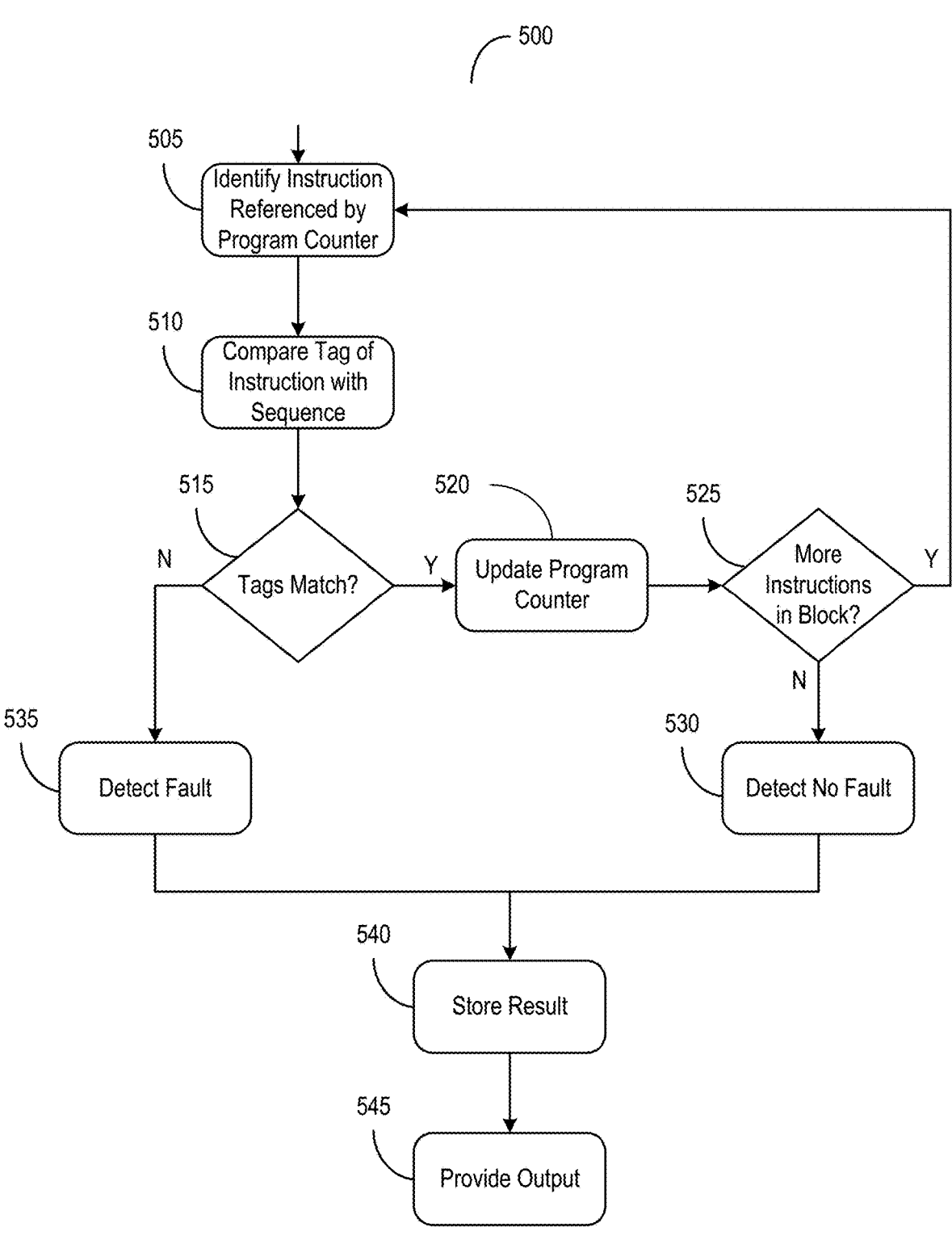
FIG. 5 depicts a flow diagram of a method of detecting faults in executing blocks of instructions, in accordance with an illustrative embodiment.

Referring now to FIG. 5, depicted is a block diagram of a method 500 of detecting faults in executing blocks of instructions. The method 500 can be implemented using or performed by any of the components detailed herein, such as the system 100. Under the method 500, one or more processors (e.g., the processor interlock 105) can identify an instruction referenced by a program counter (e.g., the program counter 145) (505). The one or more processors can compare a tag (e.g., the tag 220') assigned to the instruction with a tag (e.g., the tag 220) of the sequence (e.g., the tag sequence 215) for a block (e.g., the block 205) (510). The one or more processors can determine whether the tags match (515). If the tags match, the program counter can be updated (520). the one or more processors can determine whether there are more instructions in the block (525). If there are more instructions, the one or more processors can repeat the functionality of the method 500 from the step (505). On the other hand, if there are no more instructions, the one or more processors can detect no fault injected in the program counter (530). Conversely, if the tags do not match, the one or more processors can detect the fault (535). The one or more processors can store a result (e.g., the indication 310) based on the detection of the presence or the absence of the fault (540). The one or more processors can provide an output (e.g., the output 315) based on the result (545).

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more non-transitory computer-readable programs embodied on or in one or more articles of manufacture.

The term "article of manufacture" as used herein is intended to encompass code or logic accessible from and embedded in one or more computer-readable devices, firmware, programmable logic, memory devices (e.g., EEPROMs, ROMs, PROMs, RAMS, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method of detecting faults in executing blocks of instructions, comprising:

receiving, by at least one processor, from execution of a block of a plurality of instructions, an instruction associated with a program counter, each instruction of the plurality of instructions assigned to one of a first plurality of tags, the first plurality of tags ordered in a pre-determined sequence for the block;

comparing, by the at least one processor, a first tag of the first plurality of tags in the pre-determined sequence for the block with a second tag of a second plurality of tags assigned to the instruction associated with the program counter;

detecting, by the at least one processor, responsive to the first tag not matching the second tag, a fault with the program counter in the execution of the block; and storing, by the at least one processor, an indication identifying the fault in the execution of the block.

2. The method of claim 1, further comprising:

comparing, by the at least one processor, the first tag of the first plurality of tags in the pre-determined sequence for the block with the second tag of the second plurality of tags assigned to the instruction associated with the program counter;

detecting, by the at least one processor, responsive to the first tag matching the second tag, no fault in the execution of the block; and storing, by the at least one processor, an indication identifying no fault in the execution of the block.

3. The method of claim 1, wherein a number of tags to which to assign to the plurality of instructions of the block is determined, as a function of at least one of: (i) a number of the plurality of instructions, (ii) a number of bits to encode the plurality of instructions, or (iii) a number of altered bits in the program counter to be detected.

4. The method of claim 1, further comprising the pre-determined sequence defining an order of the first plurality of tags is generated for the plurality of instructions in the block.

5. The method of claim 1, further comprising assigning, by the at least one processor, a subset of instructions identified as critical from the plurality of instructions to a corresponding subset of tags of the first plurality of tags in the pre-determined sequence, each tag of the subset of tags different from one another.

6. The method of claim 1, further comprising assigning, by the at least one processor, at least one instruction identified as non-critical from the plurality of instructions to a neutral tag of the first plurality of tags.

7. The method of claim 1, wherein at least one of the second plurality of tags is updated on the program counter in accordance with a policy, responsive to detecting no fault in the execution of the block.

8. The method of claim 1, wherein a processor in which the program counter resides is configured with the pre-determined sequence for the first plurality of tags for detecting faults in the execution of the block.

9. The method of claim 1, further comprising performing, by the at least one processor, responsive to detecting the fault with the program counter, a countermeasure including at least one of: (i) an interruption of the execution, (ii) a halting of the execution, (iii) a processor reset, or (iv) a provision of an alert.

10. The method of claim 1, further comprising providing, by the at least one processor, an output based at least on the indication identifying the fault.

11. A system for detecting faults in executing blocks of instructions, comprising:

at least one processor coupled with memory, configured to:

identify, from execution of a block of a plurality of instructions, an instruction associated with a program counter, each instruction of the plurality of instructions assigned to one of a first plurality of tags, the first plurality of tags ordered in a pre-determined sequence for the block;

compare a first tag of the first plurality of tags in the pre-determined sequence for the block with a second tag of a second plurality of tags assigned to the instruction associated with the program counter;

detect, responsive to the first tag not matching the second tag, a fault with the program counter in the execution of the block; and store an indication identifying the fault in the execution of the block.

12. The system of claim 11, wherein the at least one processor is configured to:

compare the first tag of the first plurality of tags in the pre-determined sequence for the block with the second tag of the second plurality of tags assigned to the instruction associated with the program counter;

detect, responsive to the first tag matching the second tag, no fault in the execution of the block; and store an indication identifying no fault in the execution of the block.

13. The system of claim 11, wherein a number of tags to assign to the plurality of instructions of the block is determined, as a function of at least one of: (i) a number of the plurality of instructions or (ii) a number of bits to encode the plurality of instructions.

14. The system of claim 11, wherein the at least one processor is configured to assign a subset of instructions identified as critical from the plurality of instructions, to a corresponding subset of tags of the first plurality of tags in the pre-determined sequence, each tag of the subset of tags different from one another.

15. The system of claim 11, wherein at least one of the second plurality of tags are updated on the program counter in accordance with a policy, responsive to detecting no fault in the execution of the block.

16. The system of claim 11, wherein a processor in which the program counter resides is configured with the pre-determined sequence for the first plurality of tags for detecting faults in the execution of the block.

17. The system of claim 11, wherein the at least one processor are configured to perform, responsive to detecting the fault with the program counter, a countermeasure including at least one of: (i) an interruption of the execution, (ii) a halting of the execution, (iii) a processor reset, or (iv) a provision of an alert.

18. A non-transitory computer readable medium storing program instructions for causing at least one processor to:

receive, from execution of a block of a plurality of instructions, an instruction associated with a program counter, each instruction of the plurality of instructions assigned to one of a first plurality of tags, the first plurality of tags ordered in a pre-determined sequence for the block;

compare a first tag of the first plurality of tags in the pre-determined sequence for the block with a second tag of a second plurality of tags assigned to the instruction associated with the program counter;

detect, responsive to the first tag not matching the second tag, a fault with the program counter in the execution of the block; and store an indication identifying the fault in the execution of the block.

19. The non-transitory computer readable medium of claim 18, wherein the instructions cause the at least one processor to:

detect, responsive to the first tag of the first plurality of tags in the pre-determined sequence for the block matching the second tag of the second plurality of tags assigned to a second instruction associated with the program counter, no fault in the execution of the block; and store a second indication identifying no fault in the execution of the block.

20. The non-transitory computer readable medium of claim 18, wherein a number of tags to assign to the plurality of instructions of the block is determined, as a function of at least one of: (i) a number of the plurality of instructions or (ii) a number of bits to encode the plurality of instructions.

* * * * *